US010977379B1

(12) United States Patent
Williams et al.

(10) Patent No.: US 10,977,379 B1
(45) Date of Patent: Apr. 13, 2021

(54) UTILIZING CANARY DATA TO IDENTIFY IMPROPER DATA ACCESS

(71) Applicant: Amazon Technologies, Inc., Seattle, WA (US)

(72) Inventors: Bryan Williams, Seattle, WA (US); Khai Tran, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 16/007,611

(22) Filed: Jun. 13, 2018

(51) Int. Cl.
G06F 21/60 (2013.01)
G06F 21/62 (2013.01)
G06F 16/28 (2019.01)
G06F 16/22 (2019.01)

(52) U.S. Cl.
CPC ........ G06F 21/604 (2013.01); G06F 16/2282 (2019.01); G06F 16/285 (2019.01); G06F 21/6218 (2013.01)

(58) Field of Classification Search
CPC .. G06F 21/604; G06F 16/285; G06F 16/2282; G06F 21/6218
USPC .......................................................... 726/28
See application file for complete search history.

(56) References Cited

U.S. PATENT DOCUMENTS

| | | | | |
|---|---|---|---|---|
| 5,893,139 A * | 4/1999 | Kamiyama | ........... | G06F 12/122 711/113 |
| 10,331,519 B2 * | 6/2019 | Resch | .................... | H04L 9/0894 |
| 2004/0210796 A1 * | 10/2004 | Largman | ............... | G06F 21/575 714/20 |
| 2008/0140884 A1 * | 6/2008 | Enbody | .................. | G06F 21/54 710/57 |
| 2014/0006401 A1 * | 1/2014 | Levandoski | ........ | G06F 16/2282 707/737 |
| 2016/0337400 A1 * | 11/2016 | Gupta | .................. | G06F 16/2455 |
| 2016/0342813 A1 * | 11/2016 | Kakii | ................... | G06F 21/6254 |
| 2017/0364694 A1 * | 12/2017 | Jacob | .................... | F03D 7/0276 |
| 2018/0088870 A1 * | 3/2018 | Lv | .......................... | G06F 3/0685 |
| 2018/0165459 A1 * | 6/2018 | Baldwin | ................. | G06F 21/64 |

OTHER PUBLICATIONS

Chard, Globus Nexus: "Research Identity, Profile, and Group Management as a Service", 2014, IEEE, pp. 31-38 (Year: 2014).*

* cited by examiner

Primary Examiner — Taghi T Arani
Assistant Examiner — Gregory A Lane
(74) Attorney, Agent, or Firm — Lee & Hayes, P.C.

(57) ABSTRACT

This disclosure describes techniques implemented partly by a service provider to monitor a cloud-based service by generating and placing canary records in storage locations along with real records to identify improper access events of the records or other data. The service provider may detect an access event where records in a storage location were accessed, and determine whether a canary record was accessed. If a canary record was accessed, the service provider may determine that the access event was potentially performed by a malicious entity because authorized users generally may not have reason to access a canary record when utilizing their cloud-based service. The service provider may generate canary records that are difficult to identify by a malicious entity, and may position canary records in the storage locations to help ensure that the canary records are accessed by a malicious entity during an improper access event.

20 Claims, 9 Drawing Sheets ary records in storage locations along with real records, and using the canary records to identify improper access events of the records or other data.

UTILIZING CANARY DATA TO IDENTIFY IMPROPER DATA ACCESS

BACKGROUND

Service providers offer cloud-based services to fulfill users' computing-service needs without the users having to invest in and maintain computing infrastructure required to implement the services. These service providers may provide cloud-based computing resources and functionality to implement various types of services, such as scalable-storage services, computer-processing services, application-platform services, and so forth.

Often, cloud-based services provided by the services providers receive, store, and process private or sensitive information of clients that utilize the services. For example, users of cloud-based services may obtain sensitive client information to perform transactions with clients using client-payment information, maintain and organize client-healthcare information, organize employee information, and so forth. While providing these types of services increases user satisfaction by allowing users to efficiently utilize and manage private or sensitive data, hackers or other malicious users may attempt to obtain the sensitive client information that is stored at the computing resources. For example, malicious users may attempt to attack computing resources that store sensitive data using techniques such as mass-data exfiltration, gradual data-leak exfiltration, etc. Accordingly, users and services providers may desire techniques for detecting and/or preventing exfiltration of sensitive data stored in computing resources to protect clients.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
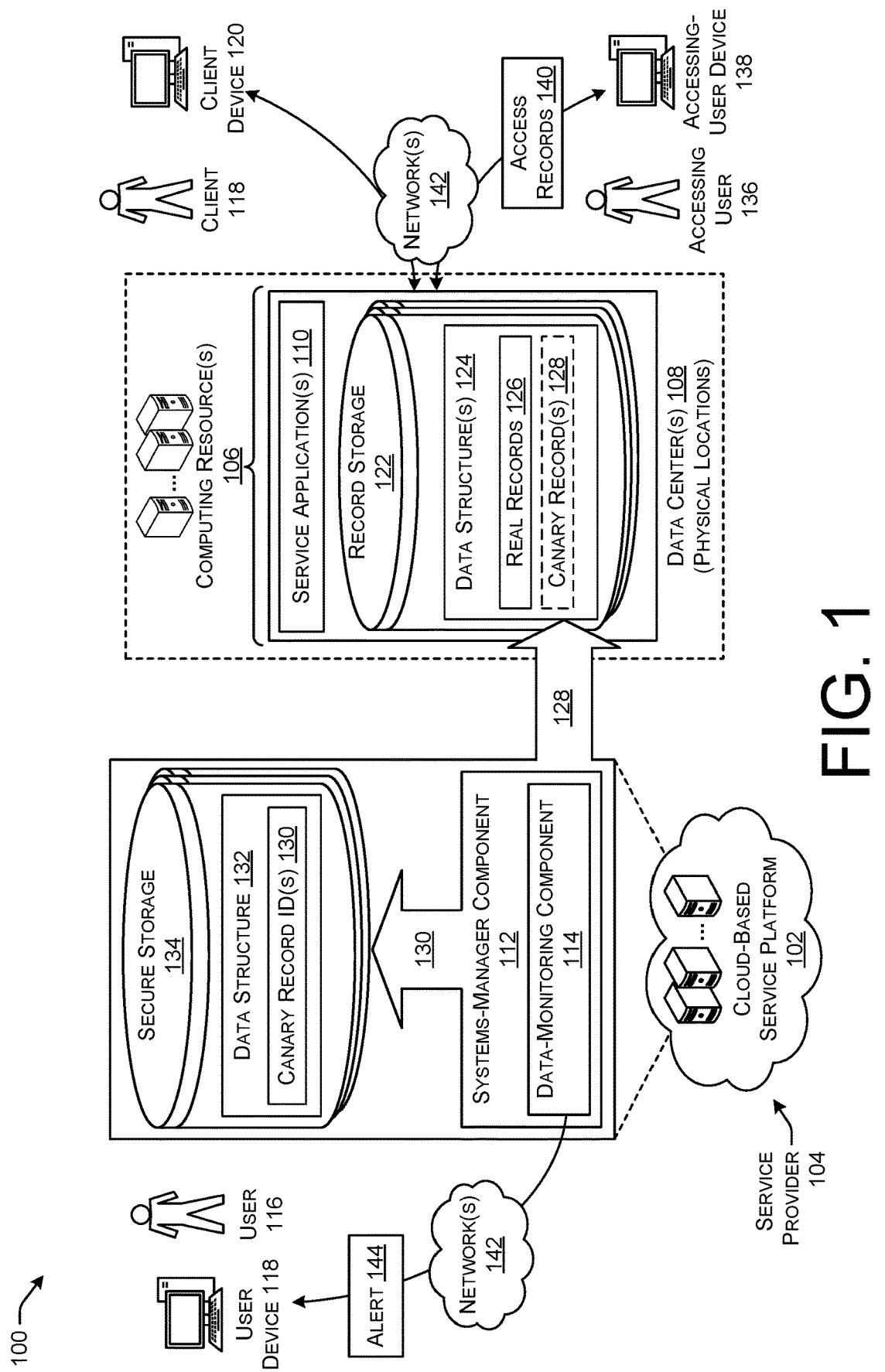
FIG. 1 illustrates a system-architecture diagram of an example environment in which a service provider monitors a cloud-based service by generating and placing canary records in storage locations along with real records, and using the canary records to identify improper access events of the records or other data.

Service providers offer various cloud-based services to users to fulfill computing needs of the users. These service providers may operate clusters of managed servers stored in data centers located across various geographic areas. In this way, users of the cloud-based services do not need to invest in and maintain the computing infrastructure required to implement the various services that they may need. Additionally, users are able to access, or provide to their clients, these cloud-based services over large geographic areas. To offer these cloud-based services across different geographic areas, service providers operate and maintain cloud-based platforms (e.g., cloud-based computing environments, network-based service architectures, network-based service infrastructures, etc.).

As noted above, users may utilize cloud-based services that receive, store, process, and so forth, various types of private or sensitive information for clients of the users. For instance, users may utilize their cloud-based services to perform transactions with clients using client payment information, maintain and organize client healthcare information, organize employee information, and so forth. Accessing entities, such as users and/or malicious users (e.g., hackers), may attempt to access storage locations for sensitive client information with the purpose of using the client information to exploit the clients, such as by improperly performing transactions using client-payment information, stealing identities of clients, and so forth. Accordingly, users and services providers may desire techniques for detecting and/or preventing exfiltration of sensitive data stored in computing resources to protect clients.

This disclosure describes, at least in part, techniques and technologies for generating and placing canary records in storage locations alongside actual client records to identify improper access of records or other data. By placing canary records (often referred to as "decoy records," "decoy data," "fake records," "fake data," and the like) that are difficult to detect as being canaries alongside actual client records in a storage location (e.g., database, repository, resource, etc.), service providers may be able to monitor and detect access events where the canary records have been accessed. Generally, canary records (e.g., canary data, decoy records, decoy data, etc.) may comprise data that resembles actual records, or real records, such that the canary records are difficult to distinguish, or indistinguishable, from the real records. In some examples, even if a potentially malicious attacker has access to source code utilized to generate the canary records, the canary records may be indistinguishable from the real records stored in the database.

As a specific example, a user may utilize a cloud-based service to perform transactions with clients, and the service may store corresponding client-transaction information in a database for various reasons, such as performing future transactions with that client. To perform a subsequent transaction, the user may periodically access the client-transaction information for that client for use in conducting the subsequent transaction. However, the user generally may not have reason to access a canary record as the canary record is not affiliated with a real client. Thus, an access event for the database where a canary record was accessed may be suspicious as a potentially malicious access event. For instance, if canary records are generated and stored in an appropriate format and/or syntax that corresponds to the actual client records (often referred to herein as "real records," "actual records," etc.) in the database, the canary records may be unidentifiable compared to actual client records such that an accessing entity that exfiltrates records from the database may exfiltrate a canary record along with the actual client records. Thus, when a service provider detects an access event where a canary record was accessed, the service provider may identify that access event as suspicious and take appropriate actions to prevent further exfiltration of records by a potentially malicious entity. In this way, the techniques described herein improve upon the ability of service providers, and users of services provided by these service providers, to detect and prevent access of sensitive data by malicious entities.

According to the techniques described herein, a service provider may provide a data-monitoring component to users who subscribe for use of cloud-based services which monitors private and/or sensitive data utilized by the user's services to identify and/or prevent potentially malicious entities from improperly accessing the sensitive data. The data-monitoring component may automatically, or upon receiving a request to enroll in the monitoring service, begin monitoring storage locations that store sensitive data/records by placing one or more canary records in the storage locations for use in detecting improper access events.

To help ensure that a malicious user is unable to identify a canary record as a fake record as opposed to a real record, the data-monitoring component may initially analyze the real records stored in the storage locations to determine a format, a syntax, and/or various parameters of the real records. For example, the data-monitoring component may parse the real records to identify property tags that identify a type of the records (e.g., credit-card information, health-care information, social-security information, etc.), to identify patterns of textual characters that match to a known type of record, etc. Once the data-monitoring component has determined an appropriate format, syntax, and/or parameters for the real records, the data-monitoring component may begin generating one or more canary records according to the format, syntax, and/or parameters such that the canary record(s) may be indistinguishable from the real records.

In some examples, the real records may be stored and subsequently identified at least partly using a universally unique identifier (UUID) (or "globally unique identifier (GUID)"). Generally, UUIDs and/or GUIDs may be 128-bit numbers that are used to identify information in computer systems. UUIDs may be generated utilizing a randomized generation scheme such that a malicious entity is unable to identify a pattern used to generate UUIDs. In this way, UUIDs may be utilized to store and identify real records, and also to randomize the generation of canary records to help make canary records indistinguishable from real records.

In addition to generating canary records that may be unidentifiable by a malicious entity compared to real records, the techniques further include intelligently positioning one or more canary records in a data structure such that a malicious user is more likely to access a canary record when exfiltrating records from the storage location. For instance, based on various attributes of the real records, such as a level or measure of sensitivity of the data (e.g., credit-card data may be more sensitive than a name of a client), the data-monitoring component may position canary records at different frequencies, at different positions or locations in the storage location, according to different sequences, etc. In this way, the use and positioning of canary records may be tailored for different users and/or different types of data.

Once the canary records are generated and placed in the storage location, the data-monitoring component may further store, in one or more secure databases, data that indicates which records are canary records, such as canary UUIDs and/or other generated canary data. In this way, when an access event is detected for the storage location, the data-monitoring component may compare a list of accessed records with the data indicating the canary records to determine whether a canary record was accessed.

To determine whether a canary record has been accessed, the data-monitoring component may receive an access-event notification, and/or monitor an access log for the storage location, to detect access events. The data-monitoring component may determine that a group of records were accessed, and potentially a type of the access (e.g., a look-up operation, a delete operation, etc.). The data-monitoring component may then compare the accessed records with the data that indicates which of the records are canary records. If the data-monitoring component determines that, based on the comparing, a canary record was accessed, the data-monitoring component may perform various actions. For instance, the data-monitoring component may alert the user of the cloud-based service that a canary record was accessed, revoke a role and/or principle of the entity who accessed the canary record, lock-down the storage location to prevent further access of the real records, etc. In this way, the data-monitoring component may detect or otherwise identify access events for canary records, and notify a user that an access event has occurred by an accessing entity, which may be a malicious entity.

The techniques described herein affect and improve the functioning of computing devices in various ways. For example, the techniques improve the ability of computing devices to securely store data, which may be particularly helpful for private or sensitive data. The techniques are generally applicable for any type of storage location, such as databases, repositories, object-storage contains, and/or any other type of computing resource capable of storing data. Further, although some of the techniques described herein are with reference to resources that are provisioned in cloud-based services, the techniques are applicable to any type of resource, including on-premise resources managed by users themselves, resources managed by other, third-party service providers, or any other type of resource for storing data and managed by any type of entity. Additionally, the techniques described herein are done so with respect to "records," such as canary records and real records, but a record can generally be any type of data that indicates information stored in a resource, such as objects. Further, the records are described herein as being stored in a table, but the records may be stored in any type of data model or data structure configured to manage and/or organize data. The term "client" is utilized herein to describe entities who perform operations with a user of a cloud-based service. However, client does not necessarily require that a financial, contractual, or other type of relationship exist with the user of the cloud-based service. Rather, a client is simply any entity who interacts with the cloud-based service of the user. Further, a user is generally any entity who subscribes for use of a cloud-based service offered by a service provider.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment in which a service provider monitors a cloud-based service by generating and placing canary records in storage locations along with real records, and using the canary records to identify improper access events of the records or other data.

As illustrated in the example environment 100, the cloud-based service platform 102 may comprise cloud-based devices and may be operated and managed by a service provider 104. The cloud-based service platform 102 may interact with, and in some examples, include one or more computing resources 106 that are each included in one or more data centers 108. The data centers 108 may be located across disparate geographical regions such that computing resource(s) 106 are available to support functionality for cloud-based services provided via the cloud-based service platform 102. The data centers 108 may be provisioned in a cloud-based computing platform associated with the cloud-based service provider 104. Additionally, or alternatively, the data centers 108 may be on-premise data centers 108 at least partly maintained and/or managed by a client. Even further, the data centers 108 may additionally, or alternatively, be provisioned in cloud-based computing platforms associated with separate cloud-based service providers. The computing resources 106 may include various combinations of hardware-based components, such as central processing units, memory, storage, network capacity, and/or any other type of hardware-based resource to support cloud-based services. In some examples, the computing resources 106 may further include respective memories that store various firmware-based and/or software-based resources that provide the functionality of the services, such as one or more applications 110. The application(s) 110 and/or other components stored in the memories, may provide functionality for implementing the services provided by the service providers 104, such as scalable-storage services, computer-processing services, application-hosting services, and so forth.

The cloud-based service platform 102 may include a systems-manager component 112 that provides a management/interaction platform and interface to users that are registered for services supported by at least the computing resources 106. The systems-manager component 112 may include, among other components, a data-monitoring component 114 configured to monitor data that is received, processed, or otherwise utilized by services supported by the computing resources 106. To utilize the services provided by the service provider 104, users 116 may register for an account with the cloud-based service platform 102. For instance, users 116 may utilize a user device 118 to interact with an identity and access management (IAM) component that allows the user 116 to create an account with the cloud-based service platform 102. Generally, the IAM component may enable users 116 to manage access to their cloud-based services and computing resources 106 securely. Generally, a user 116 is a subscriber of a cloud-based service provided by the service provider 104 and utilizes the computing resources 106 to support their cloud-based service to interact with various entities.

The systems-manager component 112 may allow the users 116 to manage their cloud-based services that are provisioned/supported in the computing-resource platform 102 and/or computing resources 106. The systems-manager component 112 may comprise a unified interface that allows users 116 to centralize operational data and automate tasks across their computing resources 106. The systems-manager component 112 may reduce the time to detect and resolve operational problems in the cloud-based service infrastructure. The systems-manager component 112 may give users 116 a complete view of cloud-based service performance and configuration, simplifies resource and application management, and simplifies operating and managing the cloud-based service at scale.

Along with other components, the systems-manager component 112 may include the data-monitoring component 114. In some examples, the user 116 may request, via their account, that the data-monitoring component 114 monitor data, such as records, stored in the computing resources 106 that support the cloud-based service that the user 116 utilizes.

In some examples, the cloud-based service that is supported by the computing resources 106 may interact, via the service application(s) 110, with one or more clients 118, such as by one or more client devices 120 depending on the service being provided by the user 116 of the cloud-based service. While the cloud-based services may comprise any type of service that may be supported by the computing resources 106, in some examples, the services may utilize private or sensitive data of the client 118. For instance, the cloud-based service that is supported by the computing resources 106 may comprise a transaction service that utilizes payment information of the client 118 to perform transactions, an employment service that manages employees of the user 116, a healthcare service utilized to manage records and other healthcare data for the clients 118 of the user 116, and/or any other type of service that utilizes private and/or sensitive information of the clients 118. Such information (also referred to herein as data, records, etc.) may comprise payment-instrument information (e.g., credit card numbers, bank account numbers, etc.), employment information (e.g., work schedules, hire dates, etc.), healthcare information (e.g., insurance provider, doctor, etc.), private user information (e.g., date-of-birth information, user-address information, social-security information, user-name information, etc.), and/or any other type of information that may be private or sensitive for the clients 118.

During the course of interacting with clients 118 via the service applications(s) 110 for the cloud-based service, the computing resources 106 may store, in various types of memories such as record storage 122 (e.g., databases, repositories, etc.), one or more data structures 122 that organize or otherwise store real records 126 for clients 118 of the cloud-based service of the user 116. For example, the user 116 and/or the clients 118 may interact with the service application 110, and the service application 110 may create and store real records 126 in the data structure 124. The real records 126 may include various types of information, including the above-mentioned sensitive data, for clients 118 of the user 116. The real records 126 may further include UUIDs, timestamps indicating when they were created, and/or other sensitive information associated with the client 118. The data structure(s) 124 may organize or store the real records 126 according to any type of data structure, such as tables, relational databases, lists, file structures, and so forth. As described in more detail with respect to FIG. 2, the data structure(s) 124 may further include property tags that identify the different types of data stored, such as property tags for rows and/or columns of data that indicate the type of data (e.g., credit card data, UUIDs, etc.). In this way, sensitive data of clients 118 may be stored in the data structures 124 for the cloud-based service.

As noted above, the user 116 may employ the data-monitoring component 114 to monitor the data (e.g., real records 126) stored in their computing resources 106. The data-monitoring component 114 may perform various operations for determining that an access event to the sensitive data occurred by a potentially malicious entity. For instance, the data-monitoring component 114 may generate and store one or more canary records 128 in the record storage 122 alongside the real records 126. In some examples, the data-monitoring component 114 may initially identify the real records 126 and analyze the real records 126 to identify a syntax, format, and/or other parameters for the real records 126. The data-monitoring component 114 may then generate the canary records 128 according to the syntax, format, and/or parameters of the real records 126. Further, the data-monitoring component 114 may store the canary records 128 in the data structure 124 of the record storage 122. In some examples, the data-monitoring component 114 may determine a location in the data structure 124 at which to store the canary record 128 as described in more detail in FIG. 2.

Further, the data-monitoring component 114 may store canary record indications (e.g., identifiers (IDs) 130 in a data structure 132 of a secure storage location 134. The secure storage 134 may comprise a storage location that is inaccessible by outside sources such that accessing entities, such as malicious users, are unable to access the secure storage 134 to determine the canary record ID(s) 130. The data structure 132 may comprise any type of data structure for storing information. The canary record IDs 130 may indicate all, or some, of the information included in the canary records 128. In this way, if records are accessed in the data structure 124, the data-monitoring component 114 may utilize the canary record IDs 130 to determine whether a corresponding canary record 128 was accessed. Thus, the canary record IDs 130 may include, for example, a UUID (or any type of sensitive data or other data) of a corresponding canary record 128 stored in the record storage 122.

The data-monitoring component 114 may then monitor the record storage 122 for access events. For instance, the data-monitoring component 114 may detect that an entity accessed the records in the record storage 122 in various ways, such as by receiving an indication from a component executing locally on the computing resources 106, by analyzing an access log, subscribing to a service, and/or any other method. The data-monitoring component 114 may, in some examples, determine that am accessing user 136 utilized a accessing-user device 138 to access records 140 stored in the record storage 122 over one or more networks 142 (e.g., WANs, PANs, LANs, etc.). The network(s) 142 may comprise any type of network or combination of network, including wired and/or wireless networks. In some examples, the accessing user 136 may comprise a malicious user, while in some examples, an authorized user may have accidently accessed a canary record 128. In either example, it may be helpful to notify the client 118 of the access event.

Upon determining that an accessing user 136 accessed the records 140 stored in the record storage 122, the data-monitoring component 114 may analyze the records that were accessed by the accessing-user device 138. For instance, the data-monitoring component 114 may determine whether data included in the records corresponds to a canary record ID 130. If at least one of the accessed records 140 has information that corresponds to the canary record IDs 130, the data-monitoring component 114 may determine that an accessing user 136 accessed the records 140. In such examples, the data-monitoring component 114 may perform various actions, such as sending an alert 144 to the user device 118 over the network(s) 142, revoking a principle and/or role of an account utilized by the accessing-user device 138, and/or freeze any further access to the record storage 122.

Figure 2:
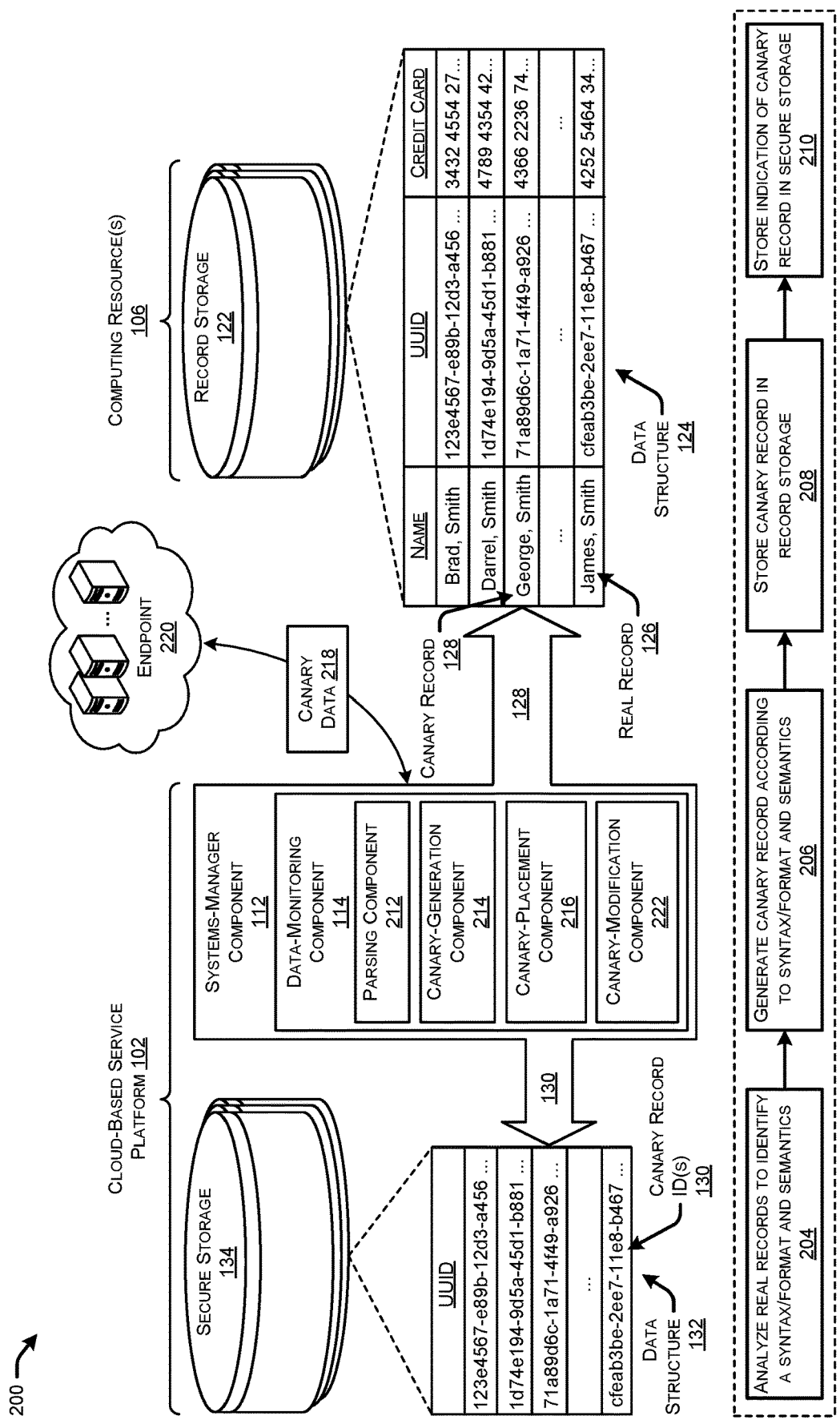
FIG. 2 illustrates a system-architecture diagram of an example environment in which a service provider monitors a cloud-based service by generating and placing canary records in storage locations along with real records.

FIG. 2 illustrates a system-architecture diagram of an example environment in which a service provider monitors a cloud-based service by generating and placing canary records in storage locations along with real records.

An environment 200 illustrated in FIG. 2 generally depicts a process 202 including steps 204, 206, 208, and 210 for generating and placing canary records 128 in storage locations (e.g., record storage 122) along with real records 126. The data-monitoring component 114 may include additional components for performing at least the functions of process 200, such as a parsing component 212, a canary-generation component 214, and a canary-placement component 216.

Generally, the parsing component 212 may be configured by one or more processors to analyze data, such as real records 126, and determine structural information about the data. At 204, the parsing component 212 may analyze real record 126 to identify a syntax/format of the real records 126, and semantics (e.g., parameters) of the real records 126. For instance, the parsing component 212 may receive a sample of real records 126 from the record storage 122, and/or access the real records 126 in the record storage 122, to determine information such as a syntax, format, and/or other parameters/semantics of the real records 126. In some examples, the data structure 124 may organize the data of the real records 126 using property tags that indicate different data properties of the real records 126. In the illustrated example, the property tags are a name of the client 118, a UUID for the record, and credit card data. As another example, some or all of the data stored in the real records 126 may be hashed using an encryption algorithm, and/or a hash function and stored as encrypted data, hash values, hash codes, or otherwise as hashes (e.g., SHA256 hash algorithm, SHA-2, etc.). In such examples, the parsing component 212 may determine the format, syntax, and/or other parameters of the encrypted data and/or hashed data, such as the algorithm(s) used. In this way, an accessing user, such as a potentially malicious entity, would be unable to determine whether a canary record 128 that includes data which has been encrypted or hashed according to the same scheme as the real records 126 is real or a canary record. However, any type of sensitive data may be stored in the data structure 124 for different types of real records 126.

In some examples, the data structure 124 may not have property tags, and the parsing component 212 may analyze the raw data of the real records 126 in order to determine a data type, such as by identifying a pattern of characters corresponding to a pattern of a credit card, a UUID, a birthdate, a timestamp, etc. In some examples, the parsing component 212 may determine additional parameters for the data. For instance, in the case of employee information, the parsing component 212 may determine that hire dates for the employees are all after a particular date (e.g., the date the company was formed). In the case of date-of-birth (DOB) information, the parsing component 212 may determine that all of the DOBs for clients 118 indicated in the real records 126 are within a particular range (e.g., all recently born babies, all elderly people, etc.). However, the parsing component 212 may determine other type of parameters based on the type of sensitive data indicated in the real record 126.

In some examples, as part of determining the parameters/semantics of the real records 126, the parsing component 212 may identify or determine semantics of the real records 126, or a logical form or structure of the real records 126. As an example, the parsing component 212 may not only identify textual characters and other data of the real records 126, but may further determine an order of the characters, types of the characters, and/or other logic forms or structures of the real records 126. For instance, the parsing component 212 may determine that the real records 126 include credit card data by identifying 16 numbers, an expiration date, a verification number, etc. However, the parsing component 212 may further determine additional formal parameters or semantics of the real records 126. For instance, the parsing component 212 may determine that the expiration dates of the credit card data fall within a date range, or that at least some of the credit cards have a same first number, or a similar first four numbers, etc. In this way, rather than simply generating a canary record 128 for credit card data where the first four numbers are simply "1234," a canary generation component 212 may generate canary records 128 according to semantics of the real records 126 as well as the structure, and generate a credit card record having a first four numbers of, for example, "4352."

Once the parsing component 212 has determined the format, syntax, and/or other parameters (e.g., semantics), the canary-generation component 214 may, at 206, generate one or more canary records 128 according to the syntax, format, and/or other parameters. The canary-generation component 214 may comprise one or more algorithms configured to generate randomized data for canary records 128 according to the format, syntax, and/or other parameters of the real records 126. In the illustrated example, the canary-generation component 214 may determine to generate a random name that is in alphabetical order with the names of the real records 126, generate a random UUID, and also generate a random credit card number. In this way, the canary record 128 resembles that of a real record 126. By generating randomized data, the canary records 128 generated by the canary-generation component 214 may be difficult to identify by the accessing users 136, and/or malicious attack algorithms, in order to ensure that the accessing users 136 access the canary records 128 in their accessed records 140.

In some examples, the canary-generation component 214 may perform various operations for determining that the canary record(s) 128 are in a correct format, syntax, and/or are semantically formatted appropriately. As a specific example, the canary-generation component 214 may utilize exterior services to verify a canary record 128 as being valid, or otherwise the same/similar as, a real record 126. For example, the canary-generation component 214 may utilize a credit card verification service which validates credit card numbers as being in an appropriate format/syntax, and/or as being semantically appropriate.

As noted above, it may be advantageous for the canary records 128 to be indistinguishable from the real records 126. Thus, the canary-generation component 214 may generate the canary records 128 such that the canary records 128 have the same format/syntax, and are semantically appropriate. In some examples, the canary records 128 may be generated such that they are within some threshold margin of similarity to the real records 126, making them substantially or practically indistinguishable from the real records 126. For instance, the canary-generation component 214 may generate a canary record 128 in a first format that is within a same machine-learning (ML) logistical regression boundary, or within a "same bucket," to a second format of the real records 126 to ensure that the canary records 128 are indistinguishable from the real records 126. The canary records 128 may in some examples be substantially identical to the real records 126, while in other examples they may be within the threshold amount or similarity to the real records 126. The canary-generation component 414 may comprise a set of rules, or heuristics, trained to determine the format/syntax, and the semantics, for the canary records 128 to ensure that the canary records 128 are the same as, or substantially similar to, the real records 126 such that the canary records 128 are indistinguishable from the real records 126.

In some examples, the client 118 may provide an endpoint 220 to which the canary-generation component 214 may send canary data 218 that is to be included in the generated canary records 128. The endpoint 220, which is discussed in more detail in FIG. 9, may comprise any type of endpoint 220, such as an application programming interface (API), configured to validate the syntax/format and/or the semantics (or other parameters) of the proposed canary data 218. The endpoint 220 may be managed by the client 118 and include components which determine whether data that is to be input into the record storage 122 is in an appropriate format and/or semantically appropriate. In some examples, the endpoint 220 may be utilized by customers, users, etc., of the client 118, and/or the client 118 themselves, when creating the real records 126. The endpoint 220 may determine if the canary data 218 to be included in the canary record 128 is appropriately formatted and semantically appropriate, and may store the canary record 128 in the record storage 122 automatically, or may provide an indication to the canary-generation component 214 that the data is appropriately formatted to be stored as a canary record 128. The canary-generation component 214, or the endpoint 220, may then store approved canary data as a canary record 128. Further description of the endpoint 220 is provided in FIG. 9.

In some examples, after the canary-generation component 214 has generated the canary record 128, a canary-modification component 222 may provide access to an entity such that the canary record 128 may be modified before being stored in the record storage 122. For example, the user 116 may modify the canary record 128 to be more appropriately formatted, and/or more semantically appropriate, for storage in the record storage 122. In some instances, the endpoint 220 may make and/or provide a suggestion of the modification to the canary-modification component 222. Further, old canary records 128 may be dynamically changed as the format and/or semantics of the real records 126 change to ensure that the canary records 128 are indistinguishable from the real records 126 as changes are made to the real records 126 over time.

In some examples, the data-monitoring component 114 may provide other access/avenues for users 116 to provide input. For instance, the data-monitoring component 112 may provide a user interface where users 116 are able to indicate the types of data stored in the record storage 122. The user interface may include text boxes, drop-down menus, or other input mechanisms by which the user 116 may indicate the types of user data stored in the record storage 122. The parsing component 212 may analyze this input and "learn" what format and semantics/parameters are utilized for the different types of data indicated by the users 116. In this way, the parsing component 212 may become more intelligent when analyzing subsequent real records 126 to determine the type of data, format, and/or semantics.

The data-monitoring component 114 may further include the canary-placement component 216 that may, at 208, store one or more canary records 128 in the record storage 122. In some examples, the canary-placement component 216 may simply place one or more canary records 128 in the data structure 124 at random locations. However, in various examples, the canary-placement component 216 may place the canary records 128 at specified or determined locations to help ensure that accessing users 136, such as malicious users, access the canary records 128. For example, the canary-placement component 216 may store the canary records 128 at predetermined frequencies (e.g., one canary record 128 placed after every four real records 126). The frequency at which canary records 128 are generated and stored/placed may be based on a sensitivity level of the real records 126. For instance, the frequency at which canary records 128 are placed for real records 126 with highly-sensitive data (e.g., credit card data, social security numbers, etc.) may be higher than a frequency at which canary records 128 are placed for real records 126 with less-sensitive data (e.g., names, addresses, etc.) are placed. Further, the canary-placement component 216 may place the canary records 128 in the record storage 122 according to sequences with respect to entries of real records 126. The sequences may be defined based on various techniques, such as known attack algorithms or vectors. For example, the canary-placement component 216 may be trained to place canary records 128 at locations where known attack vectors are known or likely to access records from the record storage 122. In this way, the canary-placement component 216 may place canary records 128 in locations according to sequences such that it may be more likely accessing users 136 access the canary records 128. In further examples, the canary-placement component 216 may place the canary records 128 at certain pages in the data structure 124 that are likely to be accessed by an accessing user 136. For instance, an accessing user may sample particular pages of records in record storage 122, such as a first page, a last page, etc. The canary-placement component 216 may place canary records 128 in the data structure(s) 124 of the record storage 122 to help ensure that accessing users 136 access the canary records 128.

In some examples, the data-monitoring component 114 may determine attack schemas by analyzing different attacks on a record storage 122 over time. For instance, the data-monitoring component 114 may enter into a "learning mode" where attacks, or access events, on record storage 122 are identified and analyzed.

In some examples, the canary-generation component 214 may monitor the record storage 122 to identify new, real records 126 being stored in the record storage 122. For example, the canary-generation component 214 may determine that the number of records stored in the record storage 122 has grown over a period of time, such as from a last time a canary record 128 was placed in the record storage 122. The canary-generation component 214 may determine to generate and place a new canary record 128 based on the amount of real records 126 growing. For example, the canary-generation component 214 may identify a group of real records 126 that have been added to the record storage 122 after storing a previous canary record 128, and determine to add a new canary record 128. In some examples, the group of newly stored real records 126 may have been added at a rate that is greater than some threshold rate (e.g., more than 10 records a day, more than 100 records a day, etc.), and the canary-generation component 214 may generate and have the canary-placement component 216 store the new canary record 128. In some examples, the group of newly stored real records 126 may be greater than a threshold number of real records 126, and the canary-generation component 216 may generate a canary record 128 and have the canary-placement component 216 store the new canary record 128 based at least in part on the group of new real records 126 being greater than the threshold number (e.g., 10 records, 100 records, etc.).

At 210, the canary-placement component 216 may further store indication(s) (e.g., canary record ID(s) 130) of the canary records 128 in the secure storage 134. In the illustrated example, the canary-placement component 216 may place the randomized UUIDs of the canary records 128 in the secure storage 134, but any type of data included in the canary records 128 may be stored as canary record IDs 130 in the secure storage 134. The data-monitoring component 114 may determine how real records 126 are accessed in the record storage 122, such as by analyzing past attacks or access events. For instance, the data-monitoring component 114 may identify commonly accessed pages in a table, common frequencies at which real records 126 are sampled from record storage 122, common batches of real records 126 that are accessed, etc. The data-monitoring component 114 may then place, using the canary-placement component 216, the canary records 128 according to the access schemas to help ensure that canary records 128 are accessed during an access event. Further, the data-monitoring component 114 may place different types of canary records 128 in the record storage 122 and analyze access events to determine what types of canary records 128 are accessed more often, and which canary records 128 are accessed less often, which may suggest how indistinguishable the different types of the canary records 128 are.

Figure 3:
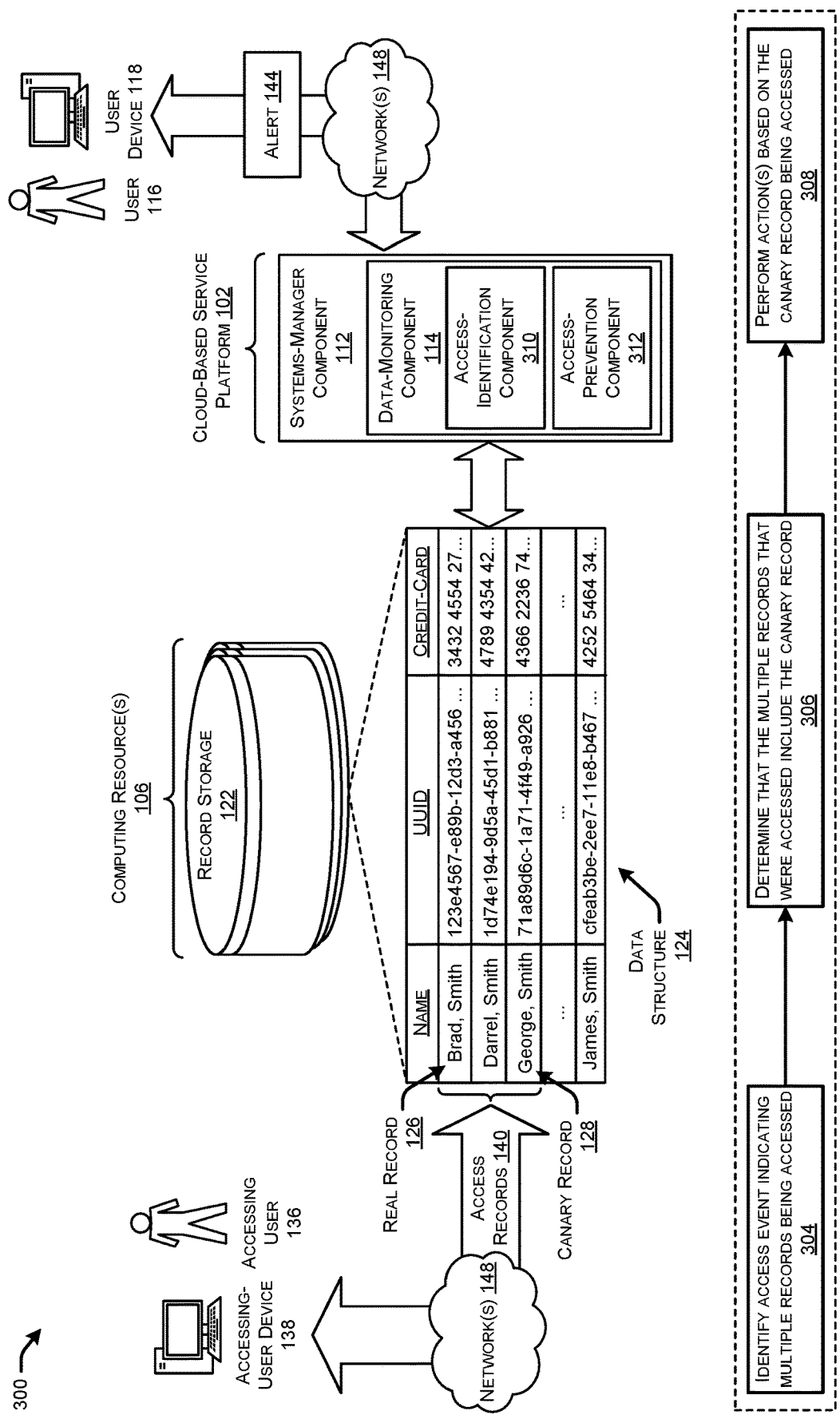
FIG. 3 illustrates a system-architecture diagram of an example environment in which a service provider identifies improper access events of the records or other data using canary records.

FIG. 3 illustrates a system-architecture diagram of an example environment in which a service provider identifies improper access events of the records or other data using canary records.

An environment 300 illustrated in FIG. 3 generally depicts a process 302 including steps 304, 306, and 308, for identifying improper access events 140 of records or other data using canary records 128 or other canary data. The data-monitoring component 114 may include additional components for performing at least the functions of process 300, such as an access-identification component 310 and an access-prevention component 312.

The access-identification component 310 may be configured to determine whether or not an entity accessed records stored in record storage 122, and also determine which records were accessed. At 304, the access-identification component 310 may identify an access event indicating multiple records were accessed. In some examples, the access-identification component 310 may receive an indication of the access event, and also an indication of the records that were accessed, from a component executing locals on the computing resources 106. In other examples, the access-identification component 310 may monitor an access log associated with the computing resource and/or record storage 122 to identify the access event and records accessed. These are merely examples, and the access-identification component 310 may identify the access event in any other way.

At 306, the access-identification component 310 may determine that the multiple records that were accessed include the canary record 128. For instance, the access-identification component 310 may match data included in the canary record 128 stored in the record storage 122 (e.g., UUID, name, credit/debit card, DOB, social security number, etc.) with the corresponding canary record ID 130 stored in the secure storage 134. In this way, the access-identification component 310 may determine that the canary record 128 is in fact a canary placed by the canary-placement component 216 and not a real record 126.

At 308, the access-prevention component 312 may perform various operations based at least in part on the canary record 128 being accessed. In some examples, the access-prevention component 312 may send, over the network(s) 142, an alert 144 to the user device 118 indicating that the canary record 128 was accessed. In other examples, the access-prevention component 312 may alert an administrator account for the cloud-based service that the canary record 128 was accessed. In some instances, the access-prevention component 312 may additionally, or alternatively, revoke access to the accessing-user device 138 that accessed the multiple records including the canary record 128. In some instances, the access-prevention component 312 may additionally, or alternatively, shut down at least a portion of the cloud-based service such that the record storage 122 is at least temporarily inaccessible to users, including the accessing user 136, to prevent further access of the real records 126.

In some examples, the access-prevention component 312 may simply perform the one or more actions at 308 if a single canary record 128 is accessed. However, in some examples, the access-prevention component 312 may only perform the one or more actions at 308 if the access event violated an improper-access threshold. In such examples, user 116 and/or the service provider 104 may define various improper-access thresholds, and access events that do not rise to these thresholds may be permitted. For instance, the access-prevention component 312 may determine that the access event violated an improper-access threshold based at least in part on the multiple records accessed being greater than or equal to a first threshold. For example, the access-prevention component 312 may only determine that the access event violated an improper threshold if the multiple records is greater than a set number (e.g., 5 records, 10 records, etc.). In some examples, the access-prevention component 312 may determine that the access event violated an improper-access threshold based at least in part on the multiple records accessed including a number of canary records 128 that is greater than or equal to another improper threshold. For example, the access-prevention component 312 may determine that an improper-access threshold was violated if more than a threshold number of canary records 128 were accessed (e.g., two canary records 128, five canary records 128, ten canary records 128, etc.). In further examples, the access-prevention component 312 may determine that the access event violated an improper-access threshold based at least in part on the multiple records accessed being greater than or equal to a threshold percentage of records stored in the first database. In some examples, the access-prevention component 312 may determine that an improper-access threshold was violated if the multiple records accessed were accessed according to a pattern defined according a known attack schema. For instance, the access-prevention component 312 may be trained to recognize known attack schemas or algorithms used by entities when accessing records, and if the multiple records are accessed according to a pattern or other feature of a known attack schema, the access-prevention component 312 may determine that an improper-access threshold was violated. In some examples, the access-prevention component 312 may determine that an improper-access threshold was violated if the multiple records accessed had more than a threshold amount of real records 126 stored between the multiple canary records 128. For instance, if one canary record 128 has more than a threshold number of real records 128 (e.g., 25 real records, 50 real records, etc.) stored between another canary record 128, the access-prevention component 312 may determine that an improper-access threshold was violated because a large amount of real records 126 were accessed, despite only two, or more in some examples, canary records 128 being accessed. Thus, in some examples the access-prevention component 312 may perform the one or more actions at 308 if at least one of the improper-access thresholds were violated, and/or other thresholds.

Figure 4:
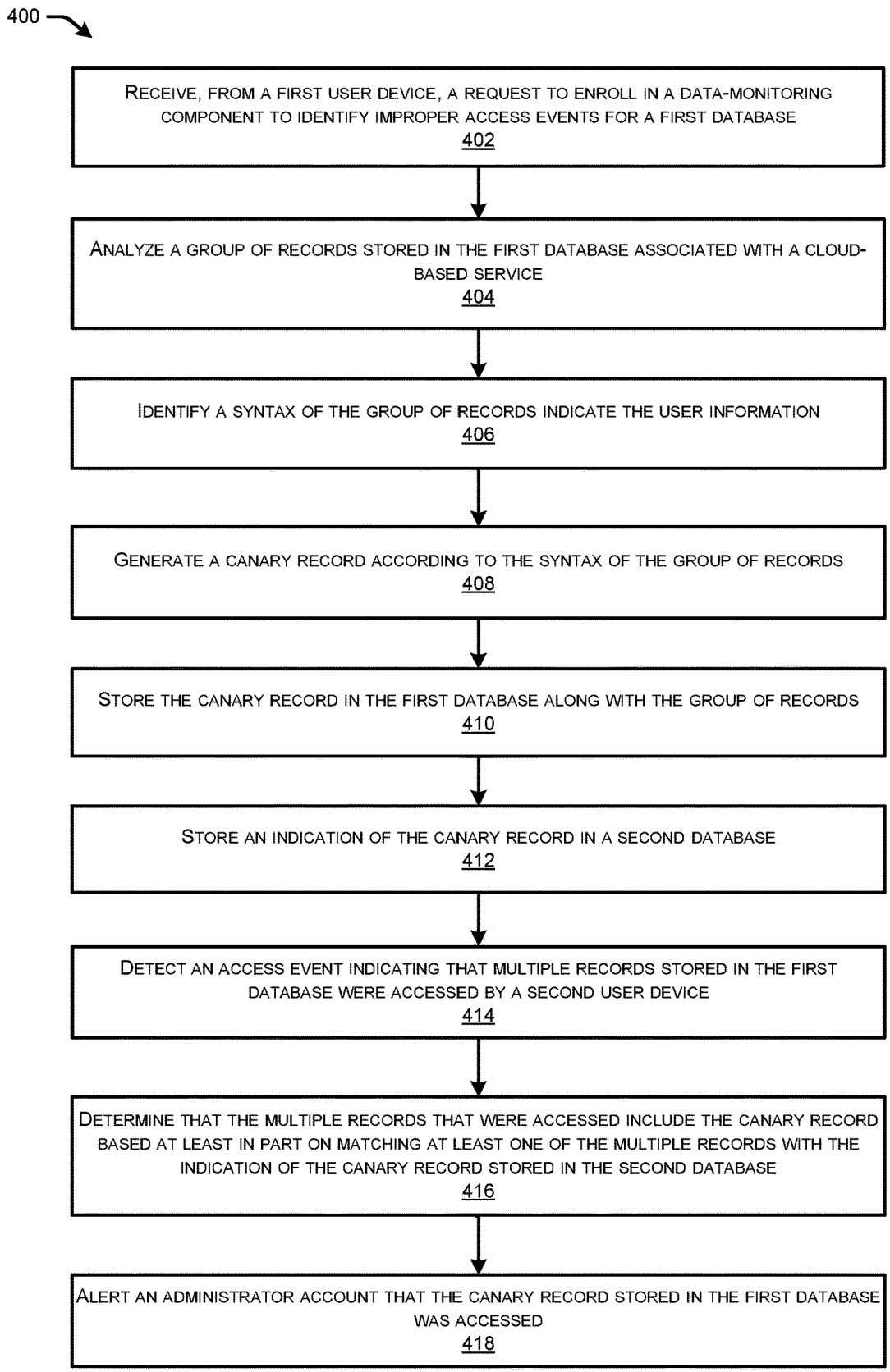
FIG. 4 illustrates a flow diagram of an example method for monitoring a cloud-based service by generating and placing canary records in storage locations along with real records, and using the canary records to identify improper access events of the records or other data.
Figure 5:
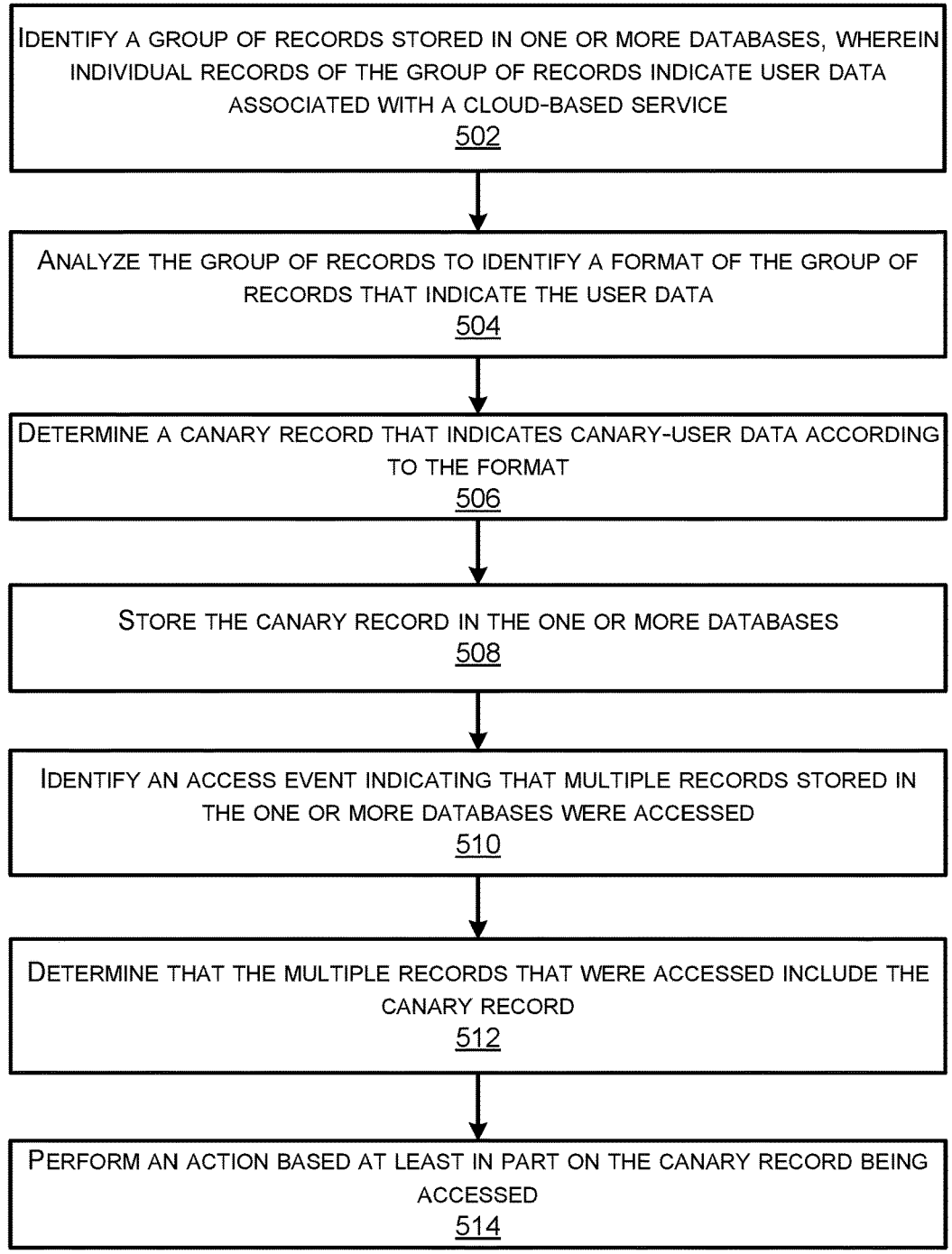
FIG. 5 illustrates a flow diagram of another example method for monitoring a cloud-based service by generating and placing canary records in storage locations along with real records, and using the canary records to identify improper access events of the records or other data.

FIGS. 4 and 5 illustrate flow diagrams of example methods 400 and 500 that illustrate aspects of the functions performed at least partly by the cloud-based service platform 102 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for monitoring a cloud-based service by generating and placing canary records in storage locations along with real records, and using the canary records to identify improper access events of the records or other data.

At 402, a cloud-based service platform 102 may receive, from a first user device (e.g., user device 118) associated with an administrator account of a cloud-based service, a request to enroll in a data-monitoring component 114 to identify improper access events for a first database (e.g., record storage 122). In some examples, the first database (e.g., record storage 122) may store a group of records (e.g., real records 126) that indicate sensitive user information utilized by the cloud-based service.

At 404, the cloud-based service platform 102 may analyze the group of records (e.g., real records 126) stored in the first database (e.g., record storage 122) associated with the cloud-based service. Further, at 406, the cloud-based service platform 102 (e.g., parsing component 212) may identify, based at least in part on the analyzing, a syntax of the group of records (e.g., real records 126) indicate the sensitive user information. In some examples, each record 126 of the group of records 126 may include a respective universally unique identifier (UUID).

In various examples, the parsing component 212 may further analyze the group of records 126 to identify a type of the user information that is indicated by the group of records 126. The type of the sensitive user information may comprise any type of sensitive information, such as at least one of payment-instrument information, employment information, healthcare information, date-of-birth information, user-address information, social-security-number information, or user-name information.

At 408, the cloud-based service 102 (e.g., canary-generation component 214) may generate a canary record 128 according to the syntax of the group of records 126. In some examples, the canary-generation component 214 may generate the canary record 128 that includes a randomly generated UUID. In some examples, the canary record 128 may be generated according to the syntax of the group of records 126, such as by creating random user information corresponding to the type of the sensitive user information that is indicated by the group of records 126.

At 410, the canary-placement component 216 may store the canary record 128 in the first database (e.g., record storage 122) along with the group of records 126. In some examples, the canary-placement component 216 may further determine a location in the first database (e.g., record storage 122) at which to store the canary record 128 based at least in part on at least one of a frequency at which canary records 128 are to be stored in the first database (e.g., record storage 122), a sequence by which canary records 128 are to be stored in the first database (e.g., record storage 122) with respect to real records 126 stored in the first database (e.g., record storage 122) that indicate sensitive user information, or a page in a table that stores the group of records 126 in which canary records 128 are to be stored. In such examples, storing the canary record 128 in the first database (e.g., record storage 122) comprises placing the canary record 128 at the determined location in the first database (e.g., record storage 122).

At 412, the canary-placement component 216 may store an indication (e.g., canary record ID(s) 130) of the canary record 128 in a second database (e.g., secure storage 134). In some examples, the indication (e.g., canary record ID(s) 130) of the canary record 128 may indicate at least the randomly generated UUID.

At 414, the access-identification component 310 may detect an access event indicating that multiple records (e.g., canary record 128, real record 126, etc.) stored in the first database (e.g., record storage 122) were accessed by a second user device (e.g., accessing-user device 138).

At 416, the access-identification component 310 may determine that the multiple records that were accessed include the canary record 128 based at least in part on matching one of the multiple records 128 with the indication (e.g., canary record ID(s) 130) of the canary record 128 stored in the second database (e.g., secure storage 134).

At 418, the access-prevention component 312 may alert the administrator account (e.g., account associated with the user 116 and/or the user device 118) that the canary record 128 stored in the first database (e.g., record storage 122). The access-prevention component 312 may further, determine that the access event violated an improper-access threshold based at least in part on one or more of the multiple records accessed being greater than or equal to a first threshold, the multiple records accessed including a number of canary records that is greater than or equal to a second threshold, the multiple records accessed being greater than or equal to a threshold percentage of records stored in the first database, or the multiple records accessed were accessed according to a pattern defined according a known attack schema. In such examples, the access-prevention component 312 may alert the administrator account based at least in part on the access event violating the improper-access threshold.

FIG. 5 illustrates a flow diagram of another example method 500 for monitoring a cloud-based service by generating and placing canary records in storage locations along with real records, and using the canary records to identify improper access events of the records or other data. The techniques may be performed by components executing on at least one [one or more cloud-based computing devices.

At 502, the data-monitoring component 114 may identify a group of records (e.g., real records 126) stored in one or more databases (e.g., record storage 122). In some examples, individual records 126 of the group of records 126 may indicate user data associated with a cloud-based service that is at least partly managed by the service provider 104.

At 504, a parsing component 212 may analyze the group of records 126 to identify a format of the group of records 126 that indicate the user data. For example, the parsing component 212 may analyze the raw data of the real records 126 in order to determine a data type, such as by identifying a pattern of characters corresponding to a pattern of a credit card, a UUID, a birthdate, a timestamp, etc. In some examples, the parsing component 212 may determine additional parameters for the data.

At 506, the canary-generation component 214 may determine a canary record 128 that indicates canary-user data according to the format. For example, the canary-generation component 214 may comprise one or more algorithms configured to generate randomized data for canary records 128 according to the format, syntax, and/or other parameters of the real records 126. In this way, the format/syntax of the canary record 128 resembles that of a real record 126.

In some examples, the canary-generation component 214 may identify, from at least one of the one or more databases or input from a user of the cloud-based service, property tags associated with the user data, and determine, based at least in part on the property tags, a type of the user data indicated in the group of records. In such examples, the canary-user data is generated by the canary-generation component 214 according to a set of rules for generating the type of the user data.

In some instances, the cloud-based service is provided for use by an account registered to a user 116 and with the service provider 104. The user 116, or operator of the account, may provide an interface by configured to validate input received from users (e.g., clients 118) of the cloud-based service as complying with parameters associated with the user data. For instance, the interface may determine that DOB information for client 118 falls within accepted dates, that credit/debit card information has a correct number of characters, that DOB information is in a correct format, and so forth. In this way, the interface provided by the user 116 to their clients 118 may ensure that real records 126 are accurate and do not have typos or other mistakes. In such examples, the canary-generation component 214 may input the canary-user data into the interface to validate the canary-user data as complying with the parameters. The canary-generation component 214 may determine that the canary-user data was validated by the interface as complying with the parameters if no error was returned, and/or if the canary record 128 was placed in the record storage 122.

At 508, the canary-placement component 216 may store the canary record 128 in the one or more databases (e.g., record storage 122) along with the real records 126. In some examples, the canary-placement component 216 may further store, in one or more secure databases (e.g., secure storage 134) associated with the service provider, an indication of the canary record (e.g., canary record ID 130).

In some examples, the parsing component 112 may determine a type of the user data indicated by each of the group of records, and further determine a sensitivity classification associated with the type of the user data. For example, a type of the user data may be credit card data which a higher sensitivity classification than a sensitivity classification for a type of the user data being a date of birth of a client 118. In such examples, the canary-placement component 216 may determine a location in the one or more databases at which to store the canary record based at least in part on one or more of a frequency at which canary records are to be stored based at least in part on the sensitivity classification of the type of the user data, a sequence by which canary records are to be stored based at least in part on the sensitivity classification of the type of the user data, or a ratio of canary records to total records stored in the one or more databases that is defined based at least in part on the sensitivity classification of the type of the user data. In such examples, the canary-generation component 214 may store the canary record 128 in the one or more databases by placing the canary record 128 at the location in the one or more databases.

At 510, the access-identification component 310 may identify an access event indicating that multiple records stored in the one or more databases were accessed. At 512, the access-identification component 310 may determine that the multiple records that were accessed include the canary record. For instance, the access-identification component 310 may match one of the multiple records with the indication of the canary record. Specifically, the respective user data indicated by each of the group of records may include a respective universally unique identifier (UUID), the canary-user data indicated by the canary record may include a randomized universally unique identifier (UUID), and the access-identification component 310 may match the one of the multiple records with the indication of the canary record comprises matching one of the respective UUIDs with the randomized UUID.

At 514, the access-prevention component 312 may perform an action based at least in part on the canary record 128 being accessed. For instance, the access-prevention component 312 may perform at least one of alert an administrator account associated with the cloud-based service that the canary record 128 was accessed, revoke access to an entity that accessed the multiple records that include the canary record 128, or shut down at least a portion of the cloud-based service such that the one or more databases are at least temporarily inaccessible.

In some examples, the access-prevention component 312 may identify identifying a previously-stored canary record in the one or more databases, determine that a previous format according to which the previously-stored canary record was generated is different than the format according to which the canary record was generated, and modify the previous format of the previously-stored canary record into the format. For example, the syntax and/or semantics for the real records may have changed, and the previously-stored canary record may need to be updated to correspond to the changes made for the real records. As a specific example, various types of databases (e.g., NoSQL) may not have a fixed schema, which allows developers to adding/remove data objects, and also modify or define new format/semantics injected into the databases. Thus, a previously-stored canary record may be updated to correspond to changes, additions, and/or removals of real records.

Figure 6:
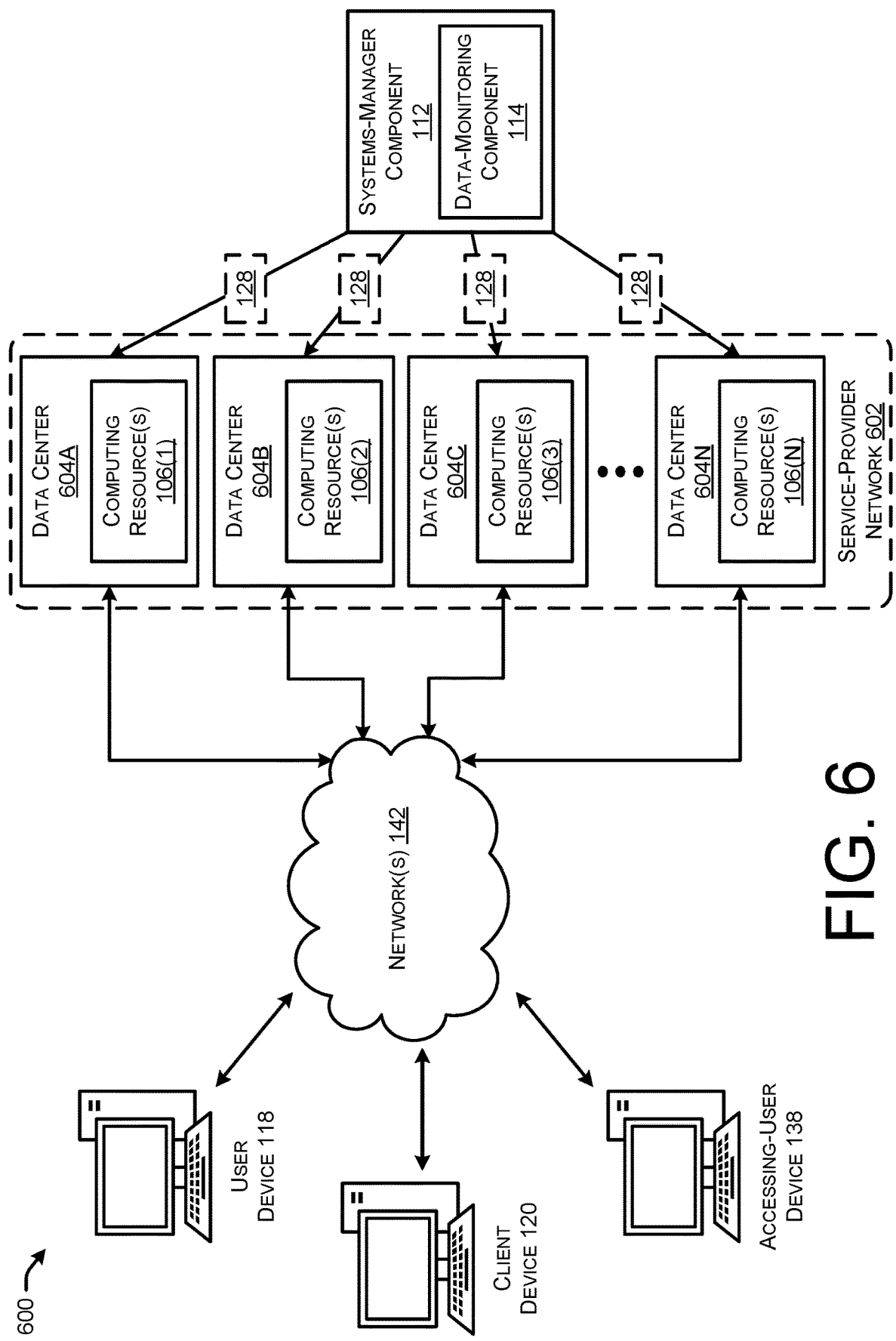
FIG. 6 is a system and network diagram that shows an illustrative operating environment that includes a service provider network that can be configured to implement aspects of the functionality described herein.

FIG. 6 is a system and network diagram that shows an illustrative operating environment 600 that includes a service-provider network 602 (that may be part of or associated with the cloud-based service platform 102) that can be configured to implement aspects of the functionality described herein.

The service-provider network 602 can provide computing resources (e.g., computing resources 106), like VM instances and storage, on a permanent or an as-needed basis. Among other types of functionality, the computing resources 106 provided by the service-provider network 602 may be utilized to implement the various services described above. As also discussed above, the computing resources provided by the cloud-based service platform 102 can include various types of computing resources, such as data processing resources like VM instances, data storage resources, networking resources, data communication resources, application-container/hosting services, network services, and the like.

Each type of computing resource provided by the service-provider network 602 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 602 can also be configured to provide other types of computing resources not mentioned specifically herein.

The computing resources provided by the service-provider network 602 may be enabled in one embodiment by one or more data centers 604A-604N (which might be referred to herein singularly as "a data center 604" or in the plural as "the data centers 604"). The data centers 604 (e.g., data centers 108) are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 6.

The data centers 604 may be configured in different arrangements depending on the service-provider network 602. For example, one or more data centers 604 may be included in or otherwise make-up an availability zone. Further, one or more availability zones may make-up or be included in a region. Thus, the service-provider network 602 may comprise one or more availability zones, one or more regions, and so forth. The regions may be based on geographic areas, such as being located within a predetermined geographic perimeter.

The users 116, clients 118, potentially accessing users 136 of the service-provider network 602 may access the computing resources 106 provided by the data centers 604 of the service-provider network 602 over any wired and/or wireless network(s) 142 (utilizing a user device 18, client device 120, and/or accessing-user device 138), which can be a wide area communication network ("WAN"), such as the Internet, an intranet or an Internet service provider ("ISP") network or a combination of such networks. For example, and without limitation, a user device 118 operated by user 116 of the service-provider network 602 may be utilized to access the service-provider network 602 by way of the network(s) 142. It should be appreciated that a local-area network ("LAN"), the Internet, or any other networking topology known in the art that connects the data centers 604 to remote clients and other users can be utilized. It should also be appreciated that combinations of such networks can also be utilized.

As shown in FIG. 6, each of the data centers 804 may include computing devices, such as computing resources 106, that include respective storage locations, such as record storage. The computing resources 106 may store the real records 126, and also receive canary records 128 from the data-monitoring component 114. As described in FIGS. 1-5, the data-monitoring component 114 may generate and store, in the computing resources 106 for each of the data centers 604, the canary records 126. In this way, if the accessing-user deice 138 accesses, via the network(s) 142, a canary record stored in one of the data centers 604, the data-monitoring component 114 may detect the corresponding access event, and identify the access event as being potentially malicious.

Figure 7:
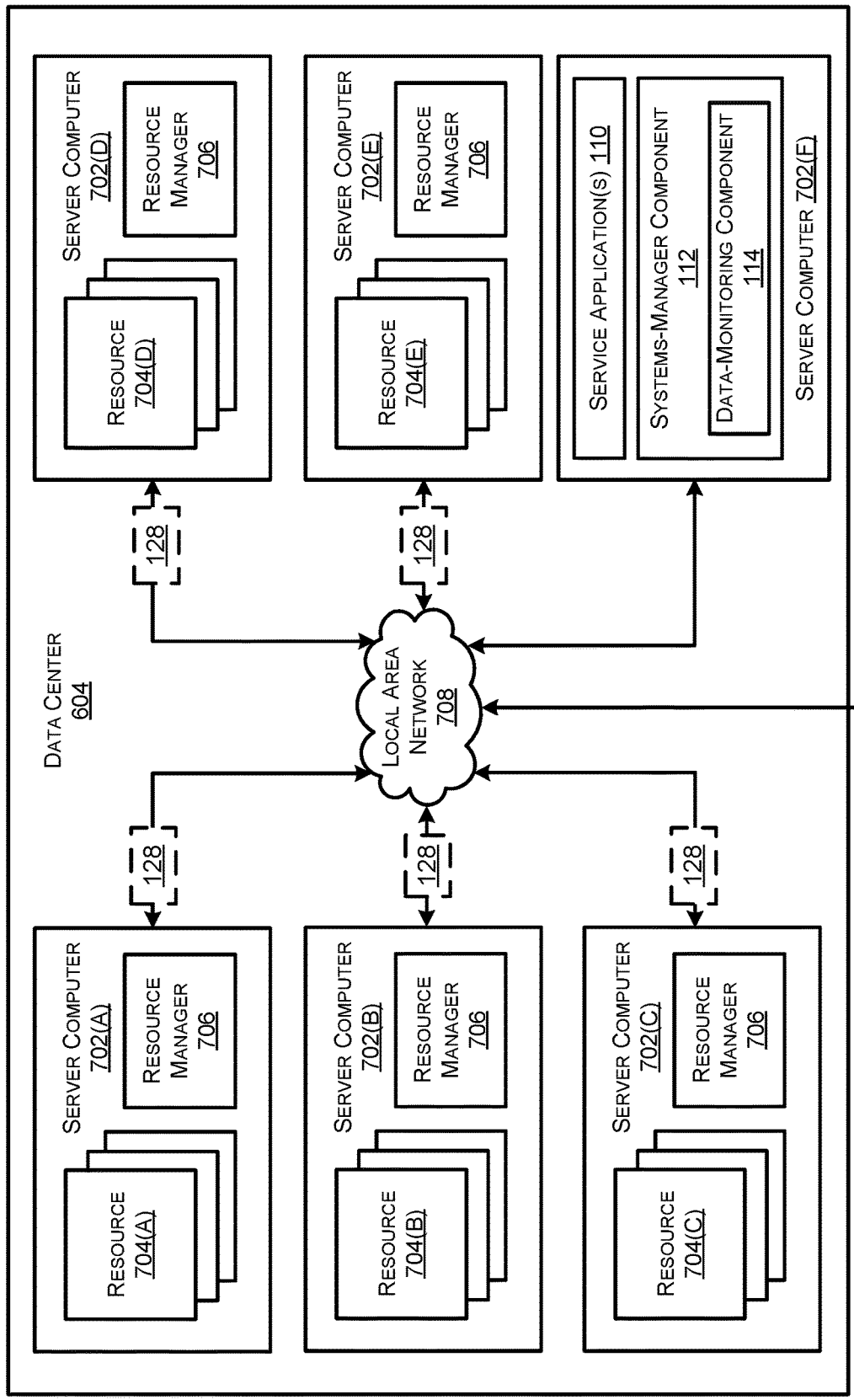
FIG. 7 is a computing system diagram illustrating a configuration for a data center that can be utilized to implement aspects of the technologies disclosed herein.

FIG. 7 is a computing system diagram illustrating a configuration for a data center 604 (e.g., data center 108) that can be utilized to implement aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E. In some examples, the resources 704 and/or server computers 702 may include, or correspond to, the computing resources 106 described herein.

The server computers 702 can be standard tower, rack-mount, or blade server computers configured appropriately for providing the computing resources described herein (illustrated in FIG. 7 as the computing resources 704A-704E). As mentioned above, the computing resources provided by the service-provider network 602 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services.

The data center 604 shown in FIG. 6 also includes a server computer 702F that can execute some or all of the software components described above. For example, and without limitation, the server computer 702F can be configured to execute components of the service-provider network 602, including the applications(s) 110, systems-manager component 112, and/or the data-monitoring-component 114 described above. The server computer 702F can also be configured to execute other components and/or to store data for providing some or all of the functionality described herein. In this regard, it should be appreciated that the services executing in the cloud-based service platform 102 may also execute on the server computer 702F and/or execute on many other physical or virtual servers in the data centers 704 in various embodiments. For instance, rather than being a centralized systems-manager component 112 that executes at a separate location that the data centers 604 (e.g., data centers 108) which store the resources 704 (e.g., computing resources 106), the systems-manager component 112 and data-monitoring component 114 may execute in a data center 604 to perform the functionality described herein. As illustrated, the data-monitoring component 114 may distribute canary records 128 to be stored in each of the resources 704 (e.g., computing resources 106), thereby allowing the data-monitoring component 114 to detect improper access events as described herein.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 702A-702F in each data center 604, and, potentially, between computing resources in each of the server computers 702. It should be appreciated that the configuration of the data center 604 described with reference to FIG. 7 is merely illustrative and that other implementations can be utilized.

Figure 8:
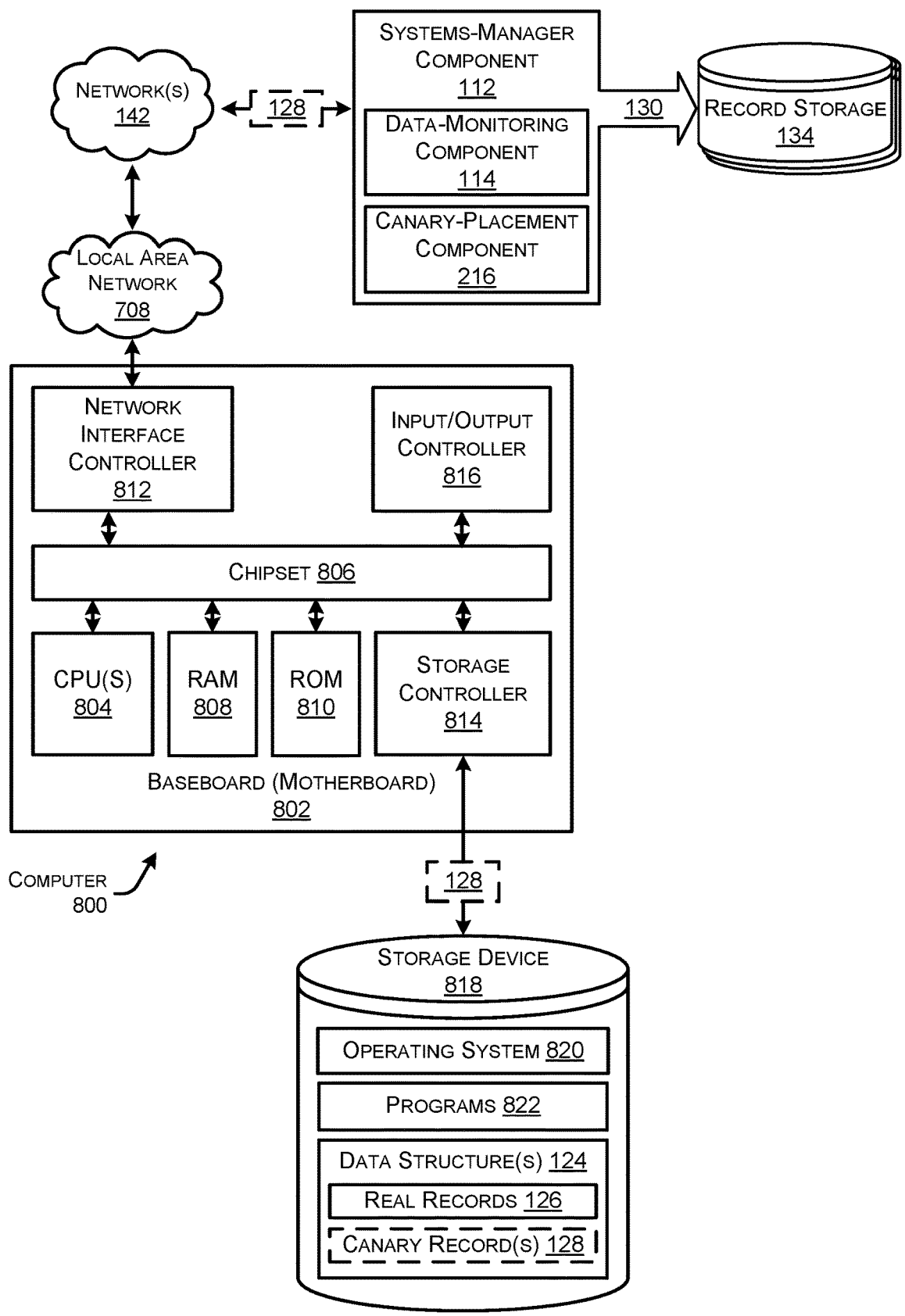
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 800 to other computing devices over the network 708 (or 142). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820 (e.g., operating systems 116(1)-(N)), programs 822 (e.g., service application(s) 110), and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the cloud-based service platform 102, and or any components included therein, may be supported by one or more devices similar to computer 800. Stated otherwise, some or all of the operations performed by the service-provider network 602, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As shown in FIG. 8, the computer 800 may receive, retrieve, or otherwise obtain canary records 128 from the data-monitoring component 114. For instance, the data-monitoring component 114 may send canary records 128 over network(s) 142 and/or LAN 708 to the network interface controller 812 of the computer 800. The computer 800 may then store the canary records 128 in the storage device along with real records 126. According to the techniques described herein, the data-monitoring component 114 may then identify access events for the storage device 818 and determine that a potentially malicious access event occurred if an entity accessed a canary record 128.

As illustrated, the canary-placement component 216 may store canary record ID(s) 130 in the secure storage 134. The secure storage 134 may be located or stored at a location that is remote from the computer 800. In this way, an accessing user 136 may be unable to access or otherwise identify the canary record ID(s) 130 to determine which of the records stored in the data structure 124 are canary records 128.

Figure 9:
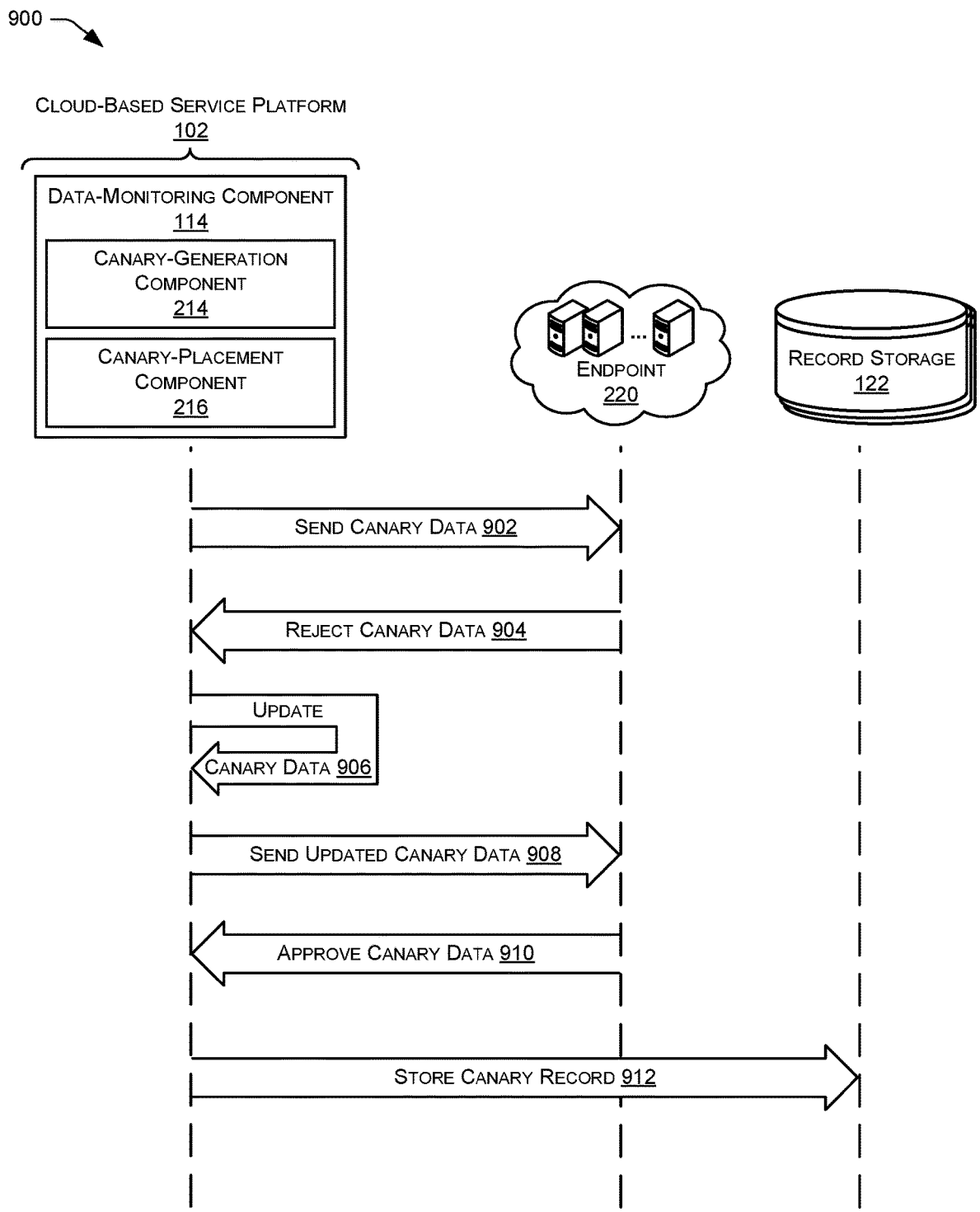
FIG. 9 is a signal flow diagram which illustrates an example process for utilizing an endpoint to validate canary data as being in an appropriate format/syntax, and/or as semantically appropriate, for storage as a canary record.

FIG. 9 is a signal flow diagram which illustrates an example process 900 for utilizing an endpoint to validate canary data as being in an appropriate format/syntax, and/or as semantically appropriate, for storage as a canary record.

At 902, the canary-generation component 214 may send canary data to the endpoint 220. In some examples, the endpoint 220 may comprise an API, or other computing resource, that is accessible (e.g., via a call or other function) by the canary-generation component 214. The endpoint 220 may be managed, provided by, or otherwise associated with the user 116. For instance, the endpoint 220 may be accessible to clients 118 associated with the user 116 such that the clients 118 are able to input data via the endpoint 220 in order to generate real records 126.

In various examples, the endpoint 220 may comprise various rules to determine whether data received at the endpoint 220 is appropriate formatted, and is semantically appropriate, to be stored as a real record 126. For instance, the endpoint 220 may determine whether credit card data is in an appropriate format and has appropriate semantics, whether birthdate information corresponds to an appropriate date for a user, etc. In this way, the user 116 whose data structure 124 is being monitored by the data-monitoring component 114 may determine whether data that is to be stored in the record storage 122 is of an appropriate format/syntax, and semantically appropriate as well.

At 904, the endpoint 220 may reject the canary data as being improper for storage as a canary record 128 in the record storage 122. For example, the endpoint 220 may determine that the canary data is in an improper format/syntax, and/or semantically inappropriate. In some examples, the endpoint 220 may further indicate what the error was with the canary data as well.

At 906, the canary-generation component 214 may update the canary data. In some examples, an administrator, engineer, or so forth of the service provider 104 may provide input to update the canary data to be in an appropriate format/syntax, and/or to be semantically appropriate. For instance, the canary-generation component 214 may provide a platform (e.g., user interface) through which an administrator associated with the data-monitoring component may provide input to update the canary data.

At 908, the canary-generation component 214 may send the updated canary data 908 to the endpoint 220 to determine whether the updated canary data is in the appropriate format, and also is semantically appropriate, to be stored as a canary record 128. The endpoint 220 may evaluate the updated canary data, and approve the canary data at 910. In some examples, at this point the endpoint 220 may simply store the canary data as a canary record 128 in the record storage 122. However, in some examples the canary-placement component 216 may instead store the canary data.

At 912, the canary-placement component 216 may store the canary data as a canary record 128 in the record storage 122 utilizing any of the techniques described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform operations comprising:
receiving, from a first user device associated with an administrator account of a cloud-based service, a request to enroll in a data-monitoring component to identify improper access events for a first database, the first database storing a group of records that indicate user information utilized by the cloud-based service;
analyzing the group of records stored in the first database associated with the cloud-based service;
identifying, based at least in part on the analyzing, a syntax of the group of records that indicate the user information;
identifying a semantic structure of the user information indicated by the group of records;
generating a canary record according to the syntax and semantic structure of the group of records;
storing the canary record in the first database along with the group of records;
storing an indication of the canary record in a second database;
detecting at least one access event by at least one of monitoring an access log associated with the first database or receiving an access-event notification associated with an access event of the at least one access event, the access event indicating that multiple records stored in the first database were accessed by a second user device;
determining that the multiple records that were accessed include the canary record based at least in part on matching one of the multiple records with the indication of the canary record stored in the second database; and
alerting the administrator account that the canary record stored in the first database was accessed.

2. The system of claim 1, the operations further comprising:

determining a location in the first database at which to store the canary record based at least in part on at least one of:
a frequency at which canary records are to be stored in the first database;
a sequence by which canary records are to be stored in the first database with respect to real records stored in the first database that indicate user information; or
a page in a table that stores the group of records in which canary records are to be stored,
wherein storing the canary record in the first database comprises placing the canary record at the location in the first database.

3. The system of claim 1, the operations further comprising:
analyzing the group of records to identify a type of the user information that is indicated by the group of records, the type comprising at least one of:
payment-instrument information;
employment information;
healthcare information;
date-of-birth information;
user-address information;
social-security-number information; or
user-name information,
wherein generating the canary record according to the syntax of the group of records includes creating random user information corresponding to the type of the user information that is indicated by the group of records.

4. The system of claim 1, the operations further comprising:
determining that the access event violated an improper-access threshold based at least in part on one or more of:
the multiple records accessed being greater than or equal to a first threshold value;
the multiple records accessed including a number of canary records that is greater than or equal to a second threshold value;
the multiple records accessed being greater than or equal to a threshold percentage of records stored in the first database; or
the multiple records accessed were accessed according to a pattern defined according a known attack schema,
wherein alerting the administrator account is based at least in part on the access event violating the improper-access threshold.

5. A computer-implemented method comprising:
identifying, by one or more cloud-based computing devices associated with a service provider, a group of records stored in one or more databases, individual records of the group of records indicating user data associated with a cloud-based service;
analyzing, by the one or more cloud-based computing devices, the group of records to identify a format of the group of records;
identifying, by the one or more-cloud-based computing devices, a semantic structure of the user data indicated by the individual records of the group of records;
determining a canary record that indicates canary-user data according to the format and the semantic structure;
storing the canary record in the one or more databases;
identifying an access event indicating that multiple records stored in the one or more databases were accessed, based at least in part on receiving an access-event notification or monitoring an access log for the one or more databases;
determining that the multiple records that were accessed include the canary record; and
performing an action based at least in part on the canary record being accessed.

6. The computer-implemented method of claim 5, further comprising:
storing, in one or more databases associated with the service provider, an indication of the canary record; and
matching one of the multiple records with the indication of the canary record.

7. The computer-implemented method of claim 6, wherein:
respective user data indicated by the individual records of the group of records includes a respective universally unique identifier (UUID);
the canary-user data indicated by the canary record includes a canary universally unique identifier (UUID); and
matching the one of the multiple records with the indication of the canary record comprises matching one of the respective UUIDs with the canary UUID.

8. The computer-implemented method of claim 5, further comprising, prior to storing the canary record:
receiving input indicating a modification of the canary record to generate a modified canary record, wherein the modification changes at least one of the format or the semantic structure of the canary record; and
storing the modified canary record in the one or more databases.

9. The computer-implemented method of claim 5, wherein the cloud-based service is provided for use by an account registered with the service provider, further comprising:
identifying an interface provided by an operator of the account, the interface being configured to validate input received from users of the cloud-based service as complying with parameters associated with the user data;
inputting the canary-user data into the interface to validate the canary-user data as complying with the parameters; and
determining that the canary-user data was validated by the interface as complying with the parameters.

10. The computer-implemented method of claim 5, further comprising:
determining a type of the user data indicated by the group of records;
determining a sensitivity classification associated with the type of the user data; and
determining a location in the one or more databases at which to store the canary record based at least in part on one or more of:
a frequency at which canary records are to be stored based at least in part on the sensitivity classification of the type of the user data;
a sequence by which canary records are to be stored based at least in part on the sensitivity classification of the type of the user data; or
a ratio of canary records to total records stored in the one or more databases that is defined based at least in part on the sensitivity classification of the type of the user data, wherein storing the canary record in the one or more databases comprises placing the canary record at the location in the one or more databases.

11. The computer-implemented method of claim 5, further comprising:
identifying, from at least one of the one or more databases or input from a user of the cloud-based service, property tags associated with the user data; and
determining, based at least in part on the property tags, a type of the user data indicated in the group of records, wherein the canary-user data is generated according to a set of rules for generating the type of the user data.

12. The computer-implemented method of claim 5, further comprising:
identifying a previously-stored canary record in the one or more databases;
determining that a previous format of the previously-stored canary record was generated is different than the format of the canary record was generated; and
modifying the previous format of the previously-stored canary record into the format.

13. The computer-implemented method of claim 5, wherein performing the action comprises at least one of:
alerting an administrator account associated with the cloud-based service that the canary record was accessed;
revoking access to an entity that accessed the multiple records that include the canary record; or
shutting down at least a portion of the cloud-based service such that the one or more databases are at least temporarily inaccessible.

14. A system comprising:
one or more processors; and
one or more non-transitory computer-readable media storing computer-executable instructions that, when executed by the one or more processors, cause the one or more processors to perform operations comprising:
identifying a group of records stored at a computing resource associated with a cloud-based service associated with a service provider, individual records of the group of records indicating user data associated with the cloud-based service;
analyzing the group of records to identify a syntax of the group of records that indicate respective user data;
identifying a semantic structure of the user data indicated by the individual records of the group of records;
determining a canary record that indicates canary-user data according to the syntax and the semantic structure;
storing an indication of the canary-user data in a database associated with the service provider;
determining, based at least in part on a type of the user data, a location at which to store the canary record at the computing resource based at least in part on one or more of:
a frequency at which canary records are to be stored;
a sequence by which canary records are to be stored; or
a threshold ratio of canary records to total records stored in the computing resource;
storing the canary record at the location in the computing resource;
detecting an access event indicating that multiple records stored at the computing resource were accessed, based at least in part on receiving an access-event notification or monitoring an access log for the computing resource; and
determining that the multiple records that were accessed include the canary record based at least in part on the indication of the canary-user data corresponding to the canary record.

15. The system of claim 14, wherein:
the user data indicated in the group of records includes a respective universally unique identifier (UUID);
the canary-user data comprises a canary UUID;
storing the indication of the canary-user data in the database comprises storing data indicating the canary UUID in the database; and
determining that the multiple records that were accessed include the canary record comprises matching a UUID indicated by one of the group of records with the canary UUID.

16. The system of claim 14, the operations further comprising at least one of:
alerting an administrator account associated with the cloud-based service that the canary record was accessed;
revoking access to an entity that accessed the multiple records that include the canary record; or
shutting down at least a portion of the cloud-based service such that the computing resource is at least temporarily inaccessible.

17. The system of claim 14, the operations further comprising:
analyzing a previous access event during which records stored in at least one of the computing resource or another computing resource were accessed;
determining, based at least in part on the previous access event, at least one of:
the frequency at which canary records are to be stored;
the sequence by which canary records are to be stored; or
the threshold ratio of canary records to total records.

18. The system of claim 14, wherein:
the canary record is in a first data format;
the individual records of the group of records are in a second data format; and
the first data format is within a threshold amount of similarity to the second data format.

19. The system of claim 18, wherein the canary record comprises a first canary record, the group of records comprises a first group of records, the operations further comprising:
identifying a second group of records that were stored in the computing resource subsequent to storing the first canary record;
determining that the second group of records is greater than a threshold number; and
storing a second canary record in the computing resource based at least in part on the second group of records being greater than the threshold number.

20. The system of claim 14, the operations further comprising:
identifying, from at least one of the computing resource or input from a user of the cloud-based service, property tags associated with the user data; and
determining, based at least in part on the property tags, a type of the user data indicated in the group of records, wherein the canary-user data is generated according to a set of rules for generating the type of the user data.

* * * * *